United States Patent [19]
Brown

[11] 3,750,170
[45] July 31, 1973

[54] VELOCIMETER FOR DETERMINING THE MAXIMUM OR MINIMUM RELATIVE VELOCITY BETWEEN TWO BODIES

[75] Inventor: David John Lyne Brown, Bayview, New South Wales, Australia

[73] Assignee: The Commonwealth of Australia, c/o The Secretary Department of the Navy, Canberra, Australia

[22] Filed: Aug. 13, 1971

[21] Appl. No.: 171,586

[30] Foreign Application Priority Data
Aug. 14, 1970  Australia.............................. 2196/70

[52] U.S. Cl...................................... 343/8, 73/167
[51] Int. Cl............................................... G01s 9/44
[58] Field of Search............................ 343/8; 73/167

[56] References Cited
UNITED STATES PATENTS
2,524,610  10/1950  Storm et al. .............................. 343/8
3,034,049  5/1962  Downs..................................... 343/8

*Primary Examiner*—Malcolm F. Hubler
*Attorney*—Eric H. Waters et al.

[57] ABSTRACT

A method and apparatus for determining maximum or minimum relative velocity between two bodies as measured radially from one of the bodies, which comprises a transmitter/receiver complex for the production of a signal the frequency of which is proportional to the relative velocity between the two bodies by means of the Doppler principle characterized in that counting is carried out by recording the number of cycles which occur in a number of fixed consecutive periods of time and automatically retaining in a memory only the maximum number of cycles which occur in a fixed period of time, whereby when a decrease in velocity occurs the last retained measurement indicates maximum velocity reached. For determination of minimum velocity, resort is made to period measurement, i.e., a maximum number of cycles of a constant frequency signal, occuring during periods of Doppler signal cycles, is retained.

16 Claims, 6 Drawing Figures

Symbols:
▷ Logic Unit "AND" Gate
+ Logic Unit - Negation i.e. Changes "One" Or "Yes" To "Zero" Or "No" And Vise Versa

VELOCIMETER FOR DETERMINING THE MAXIMUM OR MINIMUM RELATIVE VELOCITY BETWEEN TWO BODIES

BACKGROUND OF INVENTION

This invention relates to a method of and means for determining the maximum relative velocity between two bodies as measured radially from one of the bodies. An example of its use is in the determination of muzzle velocity of guns, as described below.

Muzzle velocity of a gun is defined as that velocity which the projectile would have had at the position of the muzzle, had it suffered a continuous loss of velocity in accordance with its known ballistic properties. In fact the projectile suffers a slight increase in velocity after leaving the muzzle, due to propellant gases expanding away from the muzzle. This fact is however of no interest in determining the trajectory of the projectile, and is disregarded.

The accurate determination of muzzle velocity is necessary in order to calculate with sufficient accuracy the lay of a gun, as muzzle velocity is a major factor in gun accuracy, and it varies as the inner surface of a gun barrel wears down and corrodes as rounds are fired.

Use of Doppler effects to measure the velocity of projectiles is common, and the use of a Doppler radar unit offset from the trajectory for determination of muzzle velocity is also known. That device uses phase shift effects to determine a maximum apparent velocity of the shell relative to the radar transmitter/receiver, and the resultant measurement had to be laboriously converted by means of tables and calculations to maximum velocity and thence to muzzle velocity.

Such previous methods used contain inherent difficulties in the evaluation of results, and the object of this invention as incorporated in a device for determining muzzle velocity is to present a direct indication of muzzle velocity, with a high degree of accuracy. When used for this purpose, the invention can be conveniently applied to the already known method of offsetting the Doppler mechanism from the line of travel of a shell as it moves away from the proximity of the viewing position.

SUMMARY OF INVENTION

A. According to the basic principle, the device comprises a transmitter/receiver complex for the production of a signal whose frequency is proportional to the relative velocity between the two bodies by means of the Doppler principle. The transmission may be any periodic effect, e.g., electromagnetic radiation or pressure waves, which is capable of travelling through the intervening medium and which is subject to the Doppler effect. The determination of maximum relative velocity is carried out by counting the number of cycles which occur in the produced signal in a number of fixed consecutive periods of time and automatically retaining in a memory only the maximum number of cycles which occur in any of the fixed periods of time. That is to say, the count as such can terminate at the instant when a decrease in velocity occurs so that the last retained measurement indicates the maximum velocity reached.

B. To increase the accuracy of measurement of frequency without resort to measurement of period, i.e., a system of accurate frequency measurement whilst retaining a measurement result which is directly proportional to the frequency being measured, a local oscillator is used which operates at a frequency which is controlled to be an exact multiple of the frequency to be measured. This could be achieved for instance by comparing the phase displacement between the signal whose frequency is to be measured and a specific subharmonic of the signal produced by the local oscillator, and using that information to generate a voltage which will control the frequency of the oscillator in such a way that the aforementioned phase displacement remains constant at any particular value of frequency. The frequency of the oscillator is then measured by the usual method of counting cycles occurring within a fixed period of time, but the number of cycles available for counting in any given period of time is increased above that which would be available from the original signal, by the ratio of the frequency of the oscillator to the frequency which is required to be determined. This device could be described briefly as a "phase-locked" oscillator where phase lock is achieved between a signal whose frequency is to be determined and a subharmonic of a signal whose frequency is measured in order to determine the frequency of the aforementioned signal.

C. A further feature of the invention is the incorporation in the above system of a device wherein the validity of the maximum measurement made is automatically determined by a monitor which determines if phase lock has been retained over the periods of measurement which are:

a. the one during which the maximum measurement occurred;
b. the one preceding that period, and
c. the one subsequent to the period in which the maximum reading occurred. Phase lock cannot be retained if the signal to be determined is below a predetermined level or contains an excessive amount of interference. These are the only normal effects which would cause incorrect measurements to be made, and thus indication of an incorrect measurement is obtained.

D. As referred to earlier herein, there is already in use a device for determining the muzzle velocity of shells fired from guns, which used a Doppler radar unit offset from the trajectory and the present invention also uses a Doppler radar unit as mentioned in (A), offset from the trajectory. In both cases the effect utilized is a combination of the continual retardation of a shell having left the muzzle and the apparent increase in velocity of an object viewed from a position offset from its line of travel, as the object moves away from the proximity of the viewing position. The combination of these two effects results in the apparent velocity of the shell, as observed from a viewing position offset from the line of fire increasing to a maximum value and then decreasing. If the ballistic characteristics of the shell are known to a reasonable degree of the geometry of the line of fire, position of muzzle and viewing position are known, the muzzle velocity of the shell, i.e., the velocity that the shell would have had to have at the position of the muzzle if it had suffered constant retardation after leaving the muzzle, can be calculated.

The device using the present invention may or may not incorporate automatic calculating systems for producing a visual or other record numerically equal to the muzzle velocity, having determined the maximum value of a quantity proportional to the velocity of the shell relative to the offset viewing position, in a straight line between the shell and the viewing position.

BRIEF DESCRIPTION OF DRAWINGS

To enable the actual invention to be more fully appreciated a more detailed description will now be made of the principles of the invention involved and this will be described with reference to the accompanying drawings.

DESCRIPTION OF PREFERRED EMBODIMENT

Figure 1:
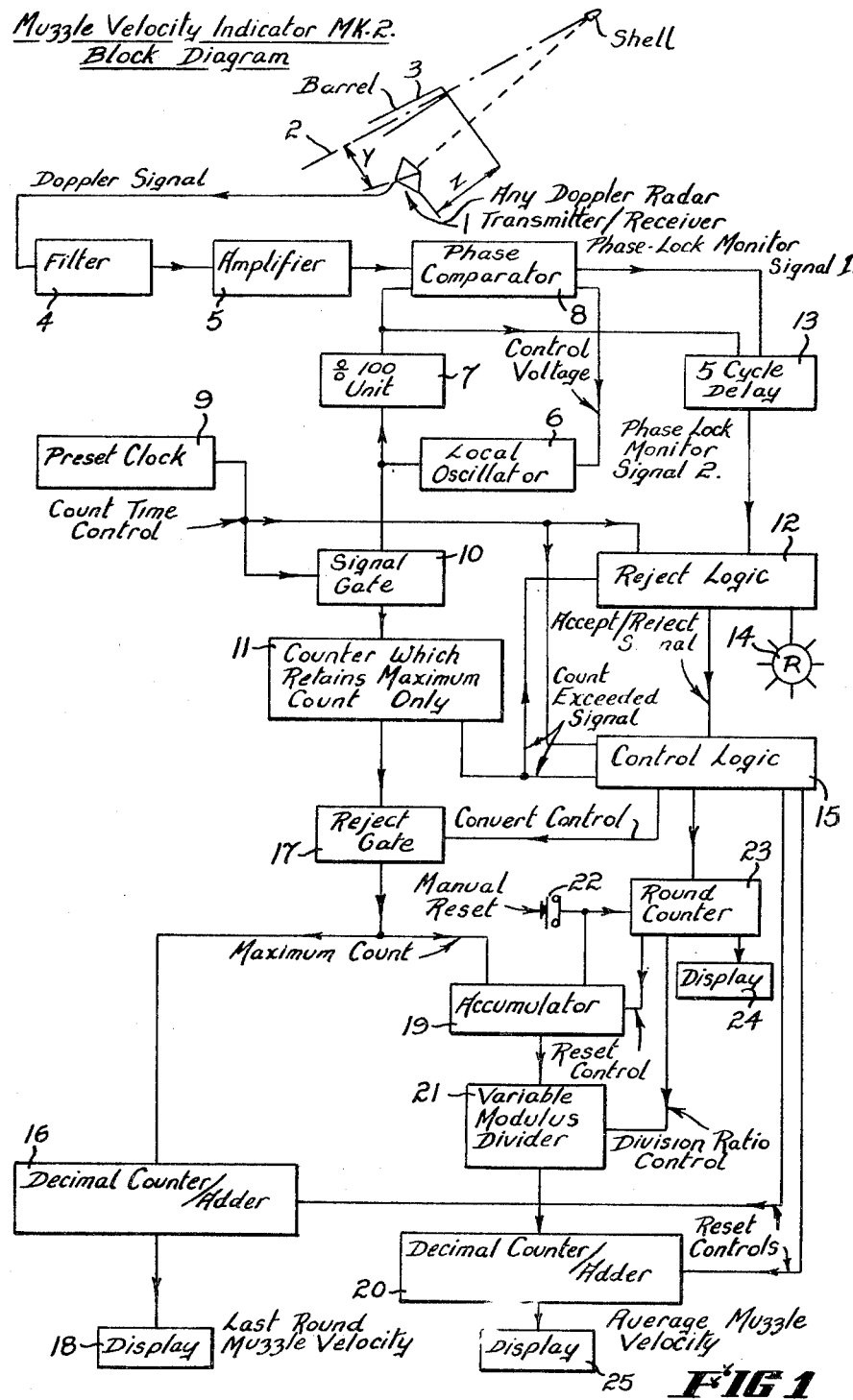
FIG. 1 is a block diagram of a muzzle velocity indicator.

Referring now to the drawings, the device incorporating these four major features referred to above under (A), (B), (C) and (D) is shown in the block diagram designated FIG. 1.

A continuous wave-radar transmitter/receiver 1 is located at a position say three feet off the boresight axis 2 of the barrel 3 and say ten feet behind the muzzle.

Figure 2:
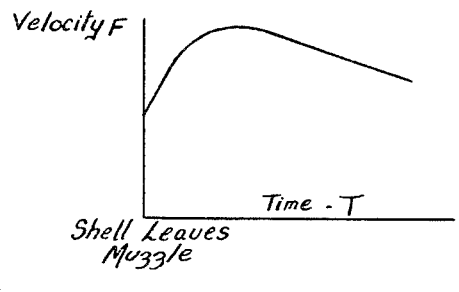
FIG. 2 which shows the velocity/time relationship of a shell leaving the muzzle of a gun, as seen radially from an offset position.

This transmitter/receiver 1 produces, as a shell passes from the gun on the initial part of its trajectory a Doppler signal whose frequency varies with time in the way indicated in FIG. 2 in which frequency F is plotted against time T.

Figure 3:
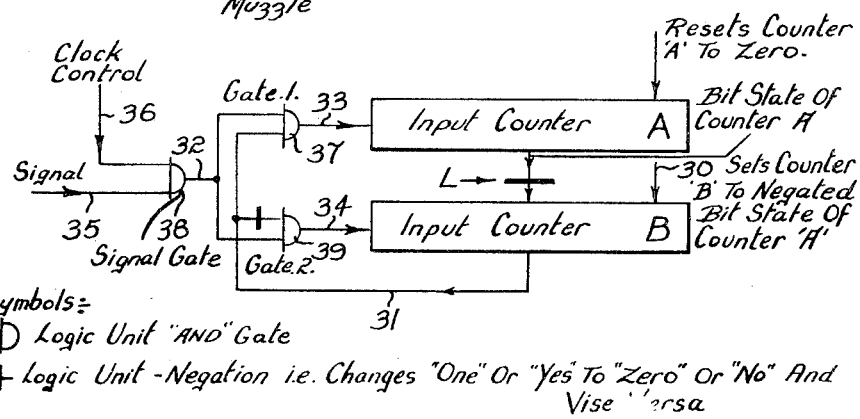
FIG. 3 shows the method used in the muzzle velocity indicator system to register a maximum count.
Figure 4:
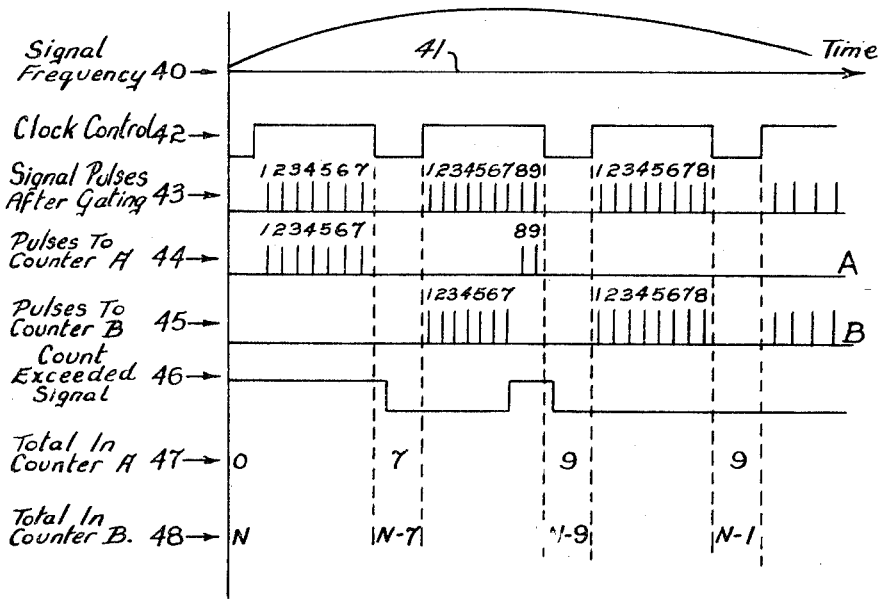
FIG. 4 shows the relationship of time to signal pulses after gating and the pulses to the respective counters, indicating the count exceeded signal, in the circuit of FIG. 3.

This signal is fed to a filter unit 4 which filters out interference. The wanted signal is then amplified by the amplifier unit 5. Then by using the phase locked oscillator system incorporating a voltage controlled oscillator 6, divide by 100 unit 7 and phase comparator 8 all as described in (B) a signal of frequency exactly 100 times that of the Doppler signal is produced. This signal is then fed to a digital frequency measuring system comprising a clock 9 which produces fixed measuring intervals the length of which can be preset, a signal gate 10 and a counter 11 which retains only the maximum cout reach i.e., doppler cycles occurring in any one measuring interval in a sequence of those intervals, according to (A). The operation of this counter 11 is described in detail later, and is shown in FIGS. 3 and 4. A monitoring system (Reject Logic) 12 according to (C) determines if the registered maximum number of cycles is a correct value. A 5 cycle delay 13 is inserted between the phase comparator 8 and the Reject Logic 12 in the phase lock monitor signal so that phase lock may in fact be lost during a measurement for up to the period of 5 cycles of doppler signal without causing rejection of the measurement. The characteristics of the local oscillator 6 are such that such a loss will not impar the accuracy of the measurement to an appreciable extent, and the incorporation of this delay makes the Reject system less sensitive to noise or doppler signal fading, which can occur.

Figure 5:
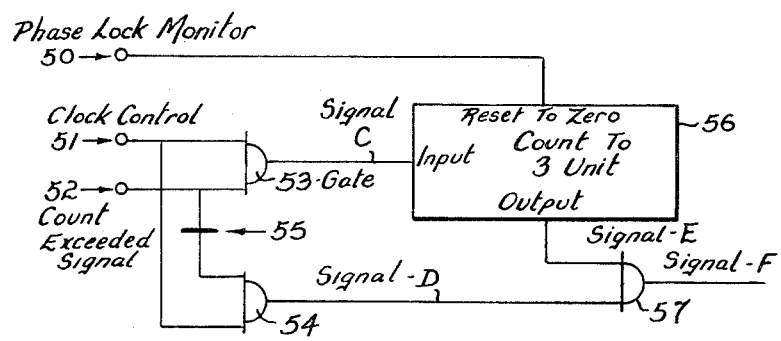
FIG. 5 shows the valid measurement logic circuit.
Figure 6:
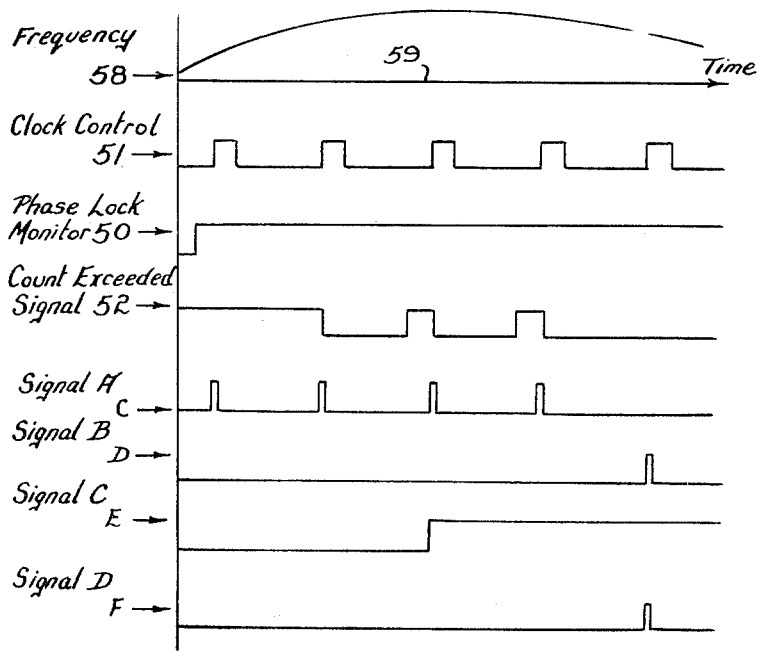
FIG. 6 shows the relationship of time to signal pulses and conditions in the logic circuit of FIG. 5.

If the Reject Logic 12 determines that the measurement is incorrect, indication of this is given by lamp 14, and a "Reject" signal is produced. The operation of the Reject Logic 12 is described in detail later and is shown in FIGS. 5 and 6. If the Reject Logic 12 determines that the measurement is correct, an "Accept" signal is sent to a central control logic 15 which, also taking in count time control signal and count exceeded signal from clock 9 and counter 11 respectively, controls the functions necessary to produce visual readings of the measurement made. First, decimal counter 16 is reset to a preset constant value. Then a convert control signal is sent to Reject gate 17 which allows the maximum count held by Counter 11 to be sent in binary form to decimal counter 16 which converts the binary count into a form which can control a decimal display 18 and also adds the present constant to the count. At the same time the maximum count is sent in binary form to an accumulator 19 which adds maximum counts made during successive firings. The Control Logic 15 then sends a reset control to a second decimal counter 20 which is thereby reset to the same preset constant value as for counter 16.

Then the contents of the accumulator are sent in binary form to a variable modulus divider 21 which divides the binary number held by the accumulator by the number of rounds fired since the accumulator was reset by manual reset control 22. This number of rounds is held by a round Counter 23 which is also reset by manual reset 22 and is stepped once at the completion of each successful measurement by the Control Logic 15. A display 24 is incorporated to indicate the number of measurements included in the accumulator 19. The output of the variable modulus divider 21 goes to decimal counter 20 which controls display 25. Provided the length of the measuring intervals T produced by clock 9 and the preset constant B to which counters 16 and 20 are reset are correct according to data following, the readings resulting in displays 18 and 25 will be numerically equal to the muzzle velocity, in feet per second, of the last round fired and the average of all rounds fired since the manual reset 22 was last operated, within certain limits of accuracy. This is because the relationship between maximum relative radial velocity between the shell and the radar unit, and the shell's muzzle velocity, can be approximated to by the formula $$V_m = A \cdot V_{Rmax} = B \text{ egn}$$

(1)

where $A$ and $B$ are constants predetermined as follows:

$$A = 1 + 0.5 \, [Y \cdot f_x/v]^{2/3}$$

$$B = V^{1/3} \cdot (Y \cdot f_x)^{2/3} - f_x \cdot z$$

and $V_m$ = muzzle velocity $V_{Rmax}$ = maximum relative radial velocity $Y$ = distance between radar antenna and line of fire, at right angles to line of fire $z$ = distance between radar antenna and muzzle, measured along line of fire $f_x$ = retardation factor of shell, expressed as loss of velocity per distance travelled $V$ = a nominal figure of velocity within 20 percent of the expected value of $V_m$.

Now because of the doppler effect $$f_{max} = 2 \cdot V_{Rmax}/C \cdot f_T$$

where $f_{max}$ = maximum value of doppler signal frequency
$C$ = velocity of propagation of radar signal
$f_T$ = radar transmitted frequency The actual signal measured has a maximum frequency = $100 f_{max}'$ and is measured over a time interval T which is short compared with the time taken for the frequency variation shown in FIG. 2. So the maximum count registered by counter 11, F, is given by, $$F = 100 f_{max} \times T$$

$$\therefore F = 200 \cdot f_T \cdot T/C \cdot V_{Rmax}$$

Therefore reading obtained on display 18 is given by $$200 \cdot f_T \cdot T/C \cdot V_{Rmax} + B$$

If then T is adjusted so that $$200 \cdot f_T \cdot T/C = \text{prescribed constant A,}$$

the conditions of *egn* (1) are met.

T and B can be adjusted so that the reading obtained is say 10 times $V_m$. A decimal point inserted permanently in displays 18 and 25 is then needed.

The operation of the round counter 23 is such that after Manual Reset 22 is operated, up to eight rounds are stored in the accumulator 19. After each of these eight rounds is fired, an average reading is shown by display 25 and the number of rounds included in that average is shown by display 24. After the eighth round is fired, the accumulator 19 is reset to zero by the round counter 23, and it proceeds to accumulate the maximum counts of any further rounds fired. The display 25 is however held, as is the figure of 8 now shown by display 24. This proceeds until eight more rounds have been measured, when the display 25 is updated by production of a new average value, which is the average of the last eight rounds fired. The procedure is then repeated indefinitely, so that the average reading displayed is updated every eighth round to the average of the preceeding eight rounds.

The operation of the counter 11 which retains maximum counts only is illustrated in FIGS. 3 and 4. Referring to that drawing, the operation of the circuit is as follows:

i. Counters A and B are binary up-counters, and Counter B sets to the ones' complement of the state of Counter A when line 30 is activated. (i.e., if the maximum count which Counter B can store is N, and the state of Counter A is P, activation of Line 30 will set Counter B to a state of N-P).

ii. Prior to operation, Counter A is set to zero, Counter B is set to its maximum count (N). This condition of Counter B activates Line 31 which switches Line 32 to Line 33 not Line 34. When a signal appears on Line 35 and the clock activates Line 36, the signal passes to Line 32 and proceeds to the input of Counter A via Gate 37 and Line 33.

iii. At the end of a counting period i.e., when Line 36 is de-activated by the clock, the signal is cut off at the signal gate 38 and Line 30 is activated, setting Counter B to the ones complement of Counter A (i.e., if the number of signal pulses in the first counting period was P, Counter B will be set to N-P). Line 31 then becomes deactivated (because Counter B is no longer at its maximum count state) and this switches Line 32 to Line 34, not line 33. Switching occurs through the second gate 39.

iv. Upon commencement of the next counting period, when the clock again activates Line 36, the signal passes to the input of Counter B, via the signal gate 38 and gate 39. If the signal frequency has increased i.e., if the number of signal pulses occurring in a counting period are now greater than P, say $(P + \delta P)$, Counter B will reach a count of N when P pulses have been counted, and this will occur before the end of the counting period. When this occurs, Line 31 becomes activated, routing the remainder of the pulses ($\delta P$) to Counter A by switching Line 32 to Line 33, not line 34. These pulses add to the P pulses stored in Counter A from the previous count period, so that at the end of the second count period, the total count of Counter A is $(P + \delta P)$, the precise number of signal pulses occurring in the second count period.

v. The above process will repeat as long as the signal frequency increases, Counter A holding a count at the end of each counting period equal to the number of signal pulses which occurred in that counting period.

vi. If however the signal frequency falls, after a maximum of say Q signal pulses have occurred in a counting period, so that in the next counting period the number of signal pulses is $(Q - \delta Q)$, Counter B will not reach a maximum count condition N before the end of the counting period, as it was set to $(N - Q)$ and has had $(Q - \delta Q)$ added, thus leaving a total of $(N - \delta Q)$. Therefore Line 31 does not become activated before the end of the counting period, and no additional pulses pass to Counter A, which now holds a count of Q. The condition of Line 31 not being activated at the end of a count period is recognised by other control circuitry, and the counting process is stopped by cutting off the signal.

vii. The total count of Q stored by counter A (in binary form) is then converted to a decimal readout by again setting Counter B to N-Q and using a control signal fed simultaneously into Counter B and a decade counter until Counter B reaches a count of N. The initial condition of the decade counter is preset to affect the addition operation required, and the final state of the decade counter is decoded and used to control a visual decimal figure display. These operations are the function of the Converter/Adder and Display, and are not shown in FIG. 3.

viii. From the above it can be seen that provided the signal frequency does not change significantly over the time of a counting period, the final state of Counter A will be a true indication of the maximum frequency reached by the signal.

ix. A similar process to the above could be achieved by changing Counter B to a Down-counter, and setting it to equal the state of Counter A instead of the ones' complement of Counter A. Line 31 would then need to be activated when Counter B reached a state of zero.

x. By using a clock which had a period shorter than the period of the signal frequency and interchanging the signal and clock functions in this circuit, an indication of maximum period (i.e., minimum frequency) would be obtained.

In FIG. 3 the logic unit indicted by L is "negation" that is, it changes "One," or "Yes" to "Zero," or "No" respectively, and vice versa.

FIG. 4 illustrates the time relationship between various parts of the circuit shown in FIG. 3, as related to a signal passing through a maximum frequency condition.

In FIG. 4 the signal frequency is shown by 40, plotted in relation to a time base 41.

The clock control is indicated by 42 while 43 indicates the signal pulses after gating.

The pulses to the Counter A are indicated by 44 while the pulses to Counter B are indicated 45. The count exceed signal is represented in 46.

The total in Counter A is indicated at 47 while the total in Counter B is indicated at 48.

The operation of the Reject Logic 12 is illustrated in FIGS. 5 and 6. It utilises three inputs to determine the correctness of the counters maximum measurement. These input functions are:

i. Phase-lock Monitor, line 50 — remains activated whilst the local oscillator signal remains in phase with the incoming Doppler signal.

ii. Clock Control, line 51 — activated for a short period between counting periods.

iii. Count Exceeded Signal, line 52 — becomes activated when the number of signal pulses in a counting period exceeds the number received in the previous counting period. (Line 31 in FIG. 3)

These three functions thus determine the validity of a maximum count. The logic behind this determination is as follows:

1. The local oscillator can only remain phase locked to the incoming signal if the amplitude of the signal remains sufficient for correct phase-lock operation, and if the rate of change of phase (and therefore also frequency) of the incoming signal is lower than the maximum rate at which the local oscillator can have its phase changed. This rate is determined by circuit constants, and is designed to be commensurate with the expected rate of change in the incoming signal. These considerations mean that noise or lack of signal sufficient to upset the measurement accuracy will cause the local oscillator to loose phase lock with the incoming signal.

2. It follows that if phase lock is maintained, the frequency of the local oscillator signal must be a direct multiple of the frequency of the incoming signal and therefore may be used as a measure of the latter's frequency.

3. If, during a counting period in which a maximum count is registered, and the counting periods immediately before and after the one in which this occurs, phase lock is maintained, then it can be said that the maximum count registered is a true representation of the maximum frequency reached by the incoming signal.

The Valid Measurement Logic Circuit is shown in basic form in FIG. 5, and operates as follows:

i. Clock control and Count Exceeded signals in lines 51 and 52 are combined to produce a signal C which becomes activated only through gate 53 when Clock Control and Count Exceeded signals are activated.

ii. Clock Control and Count Exceeded signals are also combined to produce another signal D which becomes activated only when Clock Control is activated and Count Exceeded signal is not activated.

This is achieved by using a gate 54 and logic unit 55.

iii. Signal C is connected to the input of a counter 56 which will operate only when Phase lock Monitor 50 is activated, and is reset to zero if Phase lock Monitor becomes deactivated. The counter will however only proceed from zero to a count of three input pulses, and will then remain in that condition regardless of any further input pulses, so long as the Phase lock Monitor remains activated. When the counter is at a count of three, it activates a signal E.

iv. Signals D and E are combined in a gate 57 to produce Signal F which is activated if signals D and E are activated. FIG. 6. illustrates the sequence of events in the circuit as related to a varying signal frequency.

From FIG. 6 it will be seen that for a pulse to occur in Signal F, phase lock must have been retained at least during the counting period during which the maximum count occurred, and the counting periods immediately preceding it and immediately following it. Phase lock may of course have been retained over a longer period, but this is of no concern.

The pulse in Signal F may be used to activate indication of a satisfactory measurement. This may be used to set a data store to a condition which holds an indicator illuminated unitl reset, but in the form illustrated, a data store is set if the phase locked loop goes into a phase locked condition for a preset period of time and is reset by the pulse in Signal F. The output of the data store is integrated with respect to time, so that if a correct measurement is not completed within a prescribed time of the data store being set, and indication of incorrect operation results, and this is also used to prevent any conversion of the Counter A state to a readout. (The delay in setting the data store is introduced to prevent spurious indications of malfunction, as the phase locked loop can occasionally phase lock to noise for a short period).

In FIG. 6 the graph 58 shows frequency in relation to a time base 59.

Thus a unit is provided which achieves the objects aimed at and which gives a high degree of accuracy due to the multiplication of frequency used and the exact cut-off time together with a verification that the measurement made has not been adversely affected by noise or loss of signal strength during the critical measuring period.

The deivce described in detail here is designed specifically for measurement of muzzle velocity of shells and has averaging facilities which are specifically designed to be of the most use to a particular user. Obviously variations of the device can have applications in any field when a maximum or minimum velocity requires to be measured with a high degree of accuracy and need not necessarily be limited to muzzle velocity of shells.

What I claim is:

1. A method of determining the value of the minimum radial relative velocity between two objects which may occur at any time, said method comprising mounting a transmitter and receiver apparatus operating on the Doppler principal on one of the objects, producing a Doppler signal whose frequency is proportional to the radial relative velocity between the two objects and wherein the cycles of this Doppler signal are used to de- 1. termine a series of consecutive intervals of time, each one being of the same duration as a fixed number of cycles of the Doppler signal, measuring the duration of each of these consecutive periods of time by counting the number of pulses of a fixed duration, from a stable frequency source, which occur in each period of time, determining only the minimum count achieved in any of these consecutive periods of time and using this count as a measure of the minimum value of radial relative velocity which has occured.

2. A method of determining the value of the maximum radial relative velocity between two objects which may occur at any time, said method comprising mounting a transmitter and receiver apparatus operating on the Doppler principal on one of the objects, producing a Doppler signal whose frequency is proportional to the radial relative velocity between the two objects, counting the cycles of the Doppler signal, occuring in a series of consecutive intervals of time each of the same duration, and determining the maximum value of radial relative velocity which has occurred only from the highest count achieved in any of these intervals of time.

3. The method of claim 2 comprising determining the duration of the intervals of time by a stable frequency source, and multiplying the count retained to provide an indication of the maximum radial relative velocity in terms of prescribed units of velocity.

4. The method of claim 3 wherein the locus of one object relative to the other and its acceleration are known to a reasonable degree of accuracy, computing a multiplying factor and an addition factor based on the locus and acceleration, and modifying the retained count by said factors to provide a result which is an indication of the actual relative velocity which exists between the two objects at some predetermined relative position.

5. The method of claim 2 comprising supplying the Doppler signal to a phase locked loop consisting of a phase comparator and a voltage conrolled oscillator which is made to oscillate at a frequency which is an exact multiple of the frequency of the Doppler signal, dividing the frequency of the oscillator and supplying the same as the second input to the phase comparator, controlling the frequency of the oscillator by the output of the phase comparator and counting the output of the oscillator in lieu of the Doppler signal itself to increase the sensitivity and accuracy.

6. The method of claim 5 comprising determining the duration of the intervals of time by a stable frequency source, and multiplying the count retained to provide an indication of the maximum radial relative velocity in terms of prescribed units of velocity.

7. The method of claim 6 wherein the locus of one object relative to the other and its acceleration are known to a reasonable degree of accuracy, computing a multiplying factor and an addition factor based on the locus and acceleration, and modifying the retained count by said factors to provide a result which is an indication of the actual relative velocity which exists between the two objects at some predetermined relative position.

8. The method of claim 5 comprising signalling the correctness of the indication of maximum relative velocity by a monitor circuit which determines whether the output of the voltage controlled oscillator has remained in phase with the Doppler signal for the interval of time in which the highest count was obtained, the last preceding interval of time and the first subsequent interval of time.

9. The method of claim 8 comprising determining the duration of the intervals of time by a stable frequency source, and multiplying the count retained to provide an indication of the maximum radial relative velocity in terms of prescribed units of velocity.

10. The method of claim 9 wherein the locus of one object relative to the other and is acceleration are known to a reasonable degree of accuracy, computing a multiplying factor and an addition factor based on the locus and acceleration, and modifying the retained count by said factors to provide a result which is an indication of the actual relative velocity which exists between the two objects at some predetermined relative position.

11. The method of claim 10 wherein one of said objects is a gun and the other of said objects is a shell, the transmitter and receiver being fixed in relation to the gun, the multiplying factor and addition factor being such that the result is an indication of the muzzle velocity of the shell in prescribed units of velocity.

12. The method according to claim 11 wherein the result is stored in a memory and the counting is automatically reset after completion of the multiplying and adding such that the muzzle velocity of a subsequent may be determined.

13. The method according to claim 12 comprising averaging the results over a number of shells fired and using the result of this averaging to indicate the average muzzle velocity of the shells so averaged.

14. Apparatus for measuring maximum relative velocity between two bodies as measured radially from one of the bodies, said apparatus comprising a transmitter/receiver means on one of said bodies for measuring frequency which is proportional to the relative velocity between the two bodies by means of the Doppler principle, an amplifier connected to the transmitter/receiver means to receive the said Doppler signal therefrom, a phase locked loop connected to said amplifier to receive the amplified Doppler signal therefrom, said phase locked loop comprising a phase comparator connected to the amplifier, a voltage controlled oscillator having an input connected to the output of the comparator and which is made to oscillate at a frequency which is an exact multiple of the frequency of the Doppler signal, and a divider unit having an input connected to the output of the oscillator and an output connected to the comparator, a digital frequency counting system coupled to said phase comparator and comprising a clock signal gate, and a counter connected to said gate for receiving signals from said phase comparator and constructed to retain only the maximum count, said counter comprising a pair of counter units successively fed with the Doppler signal wherein a change in the count at any one time period results in an exceeded count in one time interval indicating a maximum condition.

15. A device according to claim 14 comprising a reject logc monitoring means coupled to the phase comparator and clock for determining if the registered maximum number of cycles counted is a correct value.

16. A device according to claim 28 comprising a delay means inserted between said phase comparator and said reject logic monitoring means for allowing short interruptions of the Doppler signal without causing rejection of the measurement.

* * * * *